(12) United States Patent
Fehrle

(10) Patent No.: US 7,603,445 B1
(45) Date of Patent: Oct. 13, 2009

(54) MANAGING AND CHANGING DEVICE SETTINGS

(75) Inventor: James E. Fehrle, Menlo Park, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 815 days.

(21) Appl. No.: 10/984,903

(22) Filed: Nov. 10, 2004

(51) Int. Cl.
*G06F 15/177* (2006.01)

(52) U.S. Cl. .................. 709/220; 709/221; 709/222; 709/223; 709/224; 709/225; 709/226; 370/254; 370/453; 713/100

(58) Field of Classification Search ......... 709/220–226; 370/254, 453; 713/100
See application file for complete search history.

(56) References Cited

U.S. PATENT DOCUMENTS

| 5,889,953 | A  | * | 3/1999 | Thebaut et al. | 709/221 |
| 6,381,639 | B1 | * | 4/2002 | Thebaut et al. | 709/222 |
| 6,421,719 | B1 | * | 7/2002 | Lewis et al. | 709/224 |
| 6,766,364 | B2 | * | 7/2004 | Moyer et al. | 709/221 |
| 7,054,924 | B1 | * | 5/2006 | Harvey et al. | 709/220 |
| 2004/0153536 | A1 | * | 8/2004 | Strassner | 709/223 |
| 2005/0004942 | A1 | * | 1/2005 | Madsen et al. | 707/104.1 |

OTHER PUBLICATIONS

NetScreen; NetScreen-Global PRO™ Policy Manager, Installer & User's Guide; Version 4.1 P/N 093-0912-000 Rev. A; 18 pages; 2003.

* cited by examiner

*Primary Examiner*—Nathan J Flynn
*Assistant Examiner*—Mohammad A Siddiqi
(74) *Attorney, Agent, or Firm*—Harrity & Harrity, LLP

(57) ABSTRACT

A system facilitates the configuring of a set of devices. The system stores templates, where each template includes configuration data that applies to one or more of the devices. The system configures the devices based on the configuration data in the templates.

26 Claims, 9 Drawing Sheets

MANAGING AND CHANGING DEVICE SETTINGS

BACKGROUND

1. Field of the Invention

The principles of the invention relate generally to device management and, more particularly, to the managing and changing of device settings.

2. Description of Related Art

Security devices have been used to secure networks from intruders. A large network might deploy hundreds (if not a thousand or more) security devices to protect the network against intruders. A small network might deploy as few as about a dozen security devices.

Currently, network operators configure the security devices using a command line interface. A large security device configuration might include five thousand or more lines of data. A small security device configuration, on the other hand, might include one hundred or fewer lines of data. Current configuration techniques commonly require that a network operator enter the lines of data separately for each security device in the network. When there are hundreds (or more) of security devices, configuring the security devices becomes burdensome and error prone.

SUMMARY

According to one aspect, a system for configuring a device is provided. The system may include a memory and a processor. The memory may store a set of templates. The templates may include parameter values for the device. The processor may prioritize the templates, where a parameter value associated with a higher priority one of the templates overrides a parameter value associated with a lower priority one of the templates. The processor may configure the device based on the parameter values in the templates and the priorities of the templates.

According to another aspect, a system for configuring a device is provided. The system may include means for storing a set of templates, where a first one of the templates obtains configuration information associated with the device from a second one of the templates. The system may also include means for configuring the device based on the configuration information in the first template that was obtained from the second template.

According to yet another aspect, a system for configuring a set of devices of different types is provided. The system may include a memory and a processor. The memory may store a template associated with the devices, where the template includes generic configuration data that applies to the different types of devices. The processor may configure the devices based on the generic configuration data in the template.

According to a further aspect, a system for configuring a set of devices of different types is provided. The system may include a memory and a processor. The memory may store a first template that includes generic configuration data that applies to the different types of devices and a second template that includes specific configuration data that applies to one of the different types of devices. The processor may configure the devices based on the generic configuration data in the first template and the specific configuration data in the second template.

According to another aspect, a method for configuring a device may include associating a template with the device, where the template includes a parameter associated with the device; obtaining configuration information from the device; determining whether a parameter in the configuration information equals the parameter in the template; and removing the parameter in the configuration information when the parameter in the configuration information equals the parameter in the template.

According to a further aspect, a method for configuring devices may include associating a template with a set of devices, where the template includes configuration information associated with the devices; changing the configuration information included in the template; identifying the devices that are associated with the template; validating data associated with at least some of the identified devices; and loading the changed configuration information from the template into the identified devices.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Overview

True integration can occur when every device in a network can be controlled and every event can be seen in real time from a single location. Management systems and methods, consistent with the principles of the invention, may integrate a network of individual devices, such as security devices, into a single effective system that can be controlled from a central location.

To assist in managing and configuring multiple, possibly distributed, devices, management systems and methods, consistent with the principles of the invention, may use device templates that can specify configuration parameter values for the devices. A template may refer to a data object and methods for accessing and using it. Templates may be stored as objects, where an object may include a data structure with one or more sub-fields.

Parameter values for a device may be configured by referring to one or more templates. When a parameter value in a template is changed, the parameter value may also change for all device configurations that refer to that template. Accordingly, templates may reduce deployment costs, reduce network complexity, permit devices to be configured more efficiently, and minimize troubleshooting time.

Exemplary Network Configuration

Figure 1:
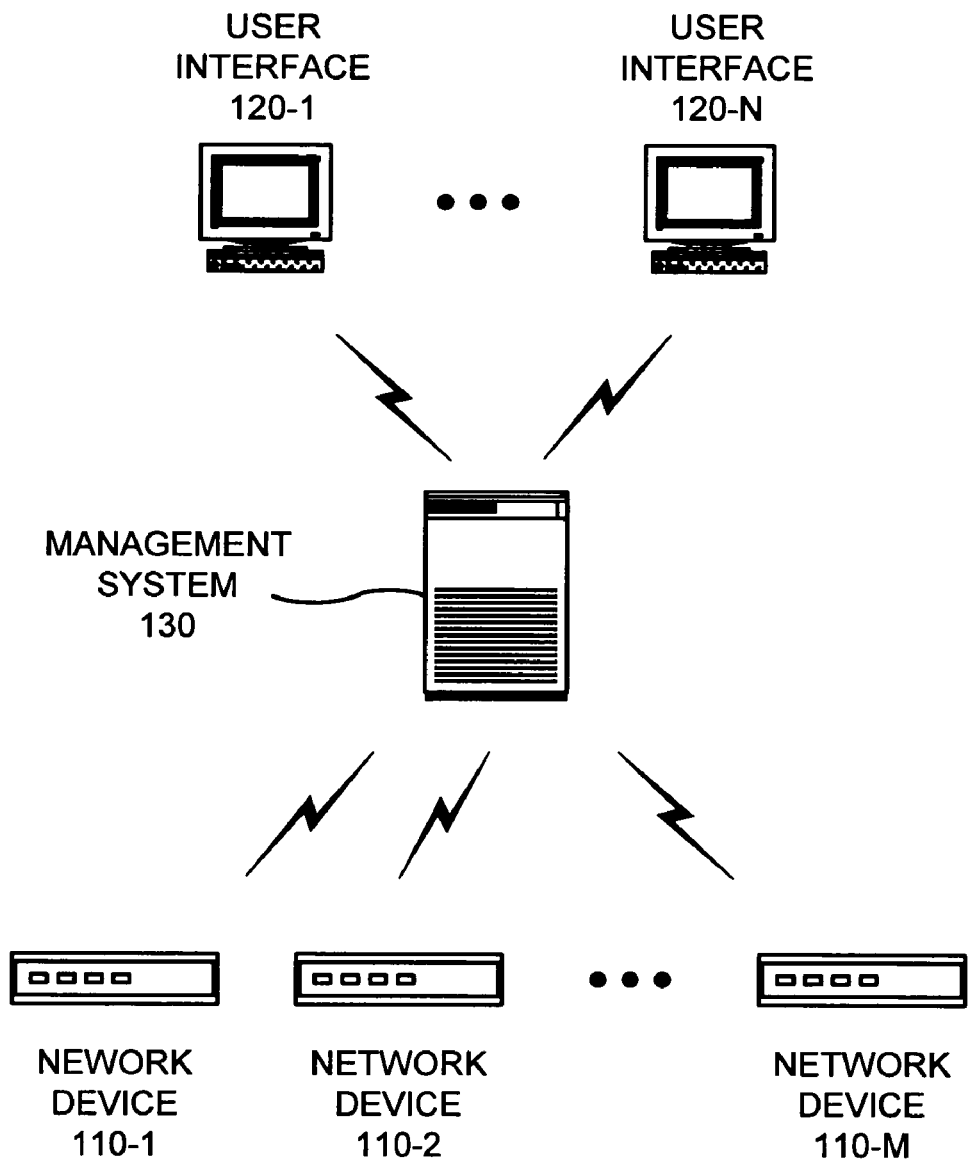
FIG. 1 is a block diagram illustrating an exemplary network in which systems and methods consistent with principles of the invention may be implemented.

FIG. 1 is an exemplary diagram of a network 100 in which systems and methods consistent with the principles of the invention may be implemented. Network 100 may include network devices 110-1 through 110-M (where M≧2) (collectively referred to as network devices 110) and user interface devices 120-1 through 120-N (where N≧1) (collectively referred to as user interface devices 120) connected to a management system 130. Network devices 110 and user interface devices 120 may connect to management system 130 via wired, wireless, and/or optical connections.

Network devices 110 may include security devices (e.g., devices that perform firewall, virtual private network (VPN), denial of service (DoS) protection, traffic management processing, and/or other security-related processing) and/or other types of devices that permit access to network 100 and/or protect network 100 against malicious traffic or other forms of attack. Alternatively or additionally, network devices 110 may include computers or other types of computation or communication devices.

User interface devices 120 may include any devices capable of providing a user interface to an operator, such as a personal computer, a wireless telephone, a personal digital assistant (PDA), a laptop, or another type of computation or communication device. While FIG. 1 shows user interface devices 120 as separate from management system 130, it may be possible for management system 130 to reside in the same physical device as at least one of user interface devices 120.

The user interface may be embodied in software in user interface devices 120. The user interface may be used to remotely access management system 130 to provide a powerful, graphical environment for centrally managing network devices 110 in network 100. In one implementation, the user interface may communicate with management system 130 using a secure, proprietary, transmission control protocol (TCP)-based connection that encrypts and authenticates traffic. Multiple operators may simultaneously (or substantially simultaneously) interact with network devices 110 via user interface devices 120.

Management system 130 may be implemented within a device, such as a computer or a combination of computers. Management system 130 may provide functionality to integrate management of network devices 110 in network 100. For example, management system 130 may permit an operator to identify, configure, manage, monitor, and/or generate reports with regard to network devices 110 deployed in network 100.

Figure 2:
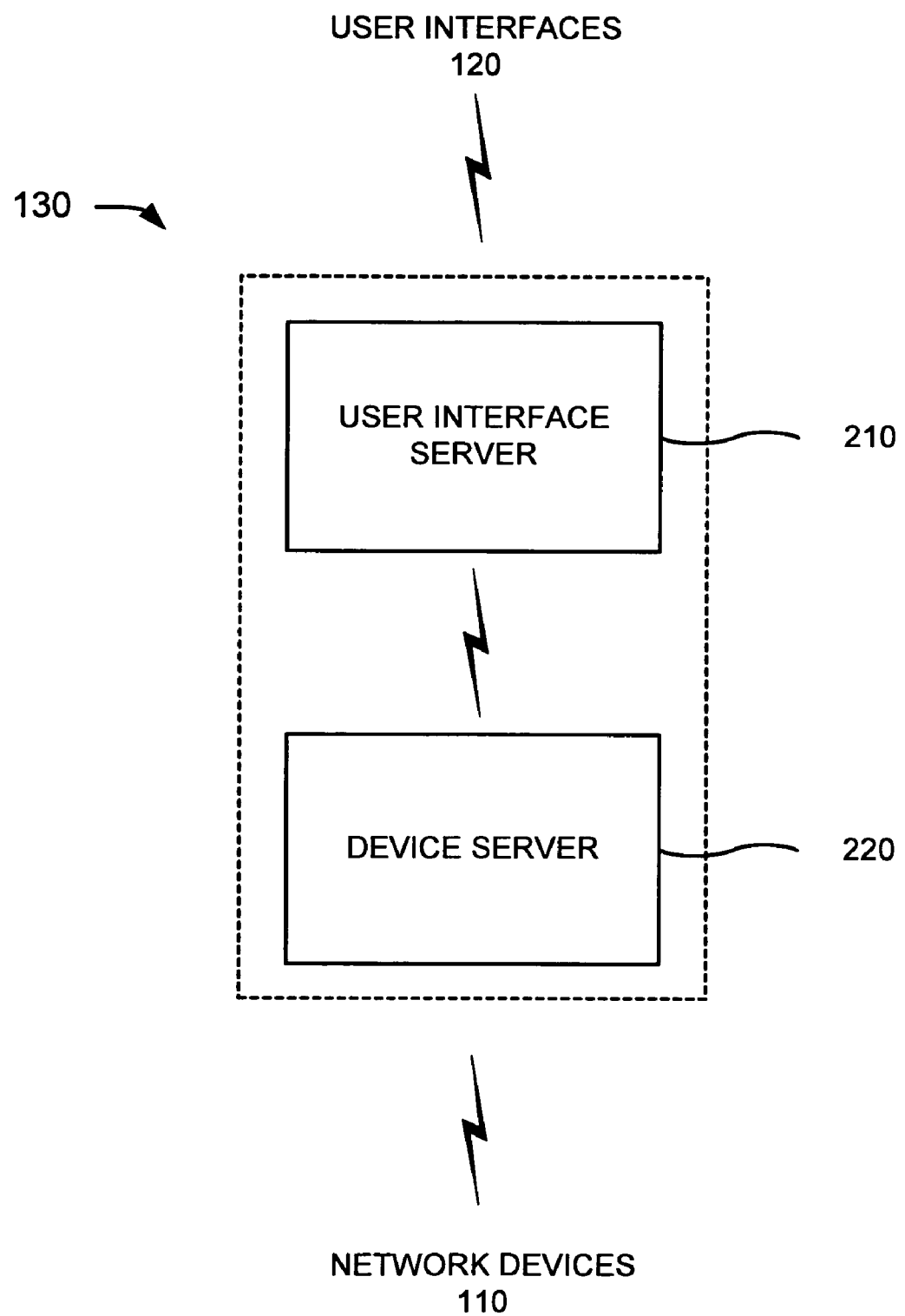
FIG. 2 is an exemplary block diagram of the management system of FIG. 1.

FIG. 2 is an exemplary diagram of management system 130 according to an implementation consistent with the principles of the invention. Management system 130 may include user interface server 210 and device server 220. User interface server 210 and device server 220 may work collectively to perform the functions of management system 130. In one implementation, user interface server 130 and device server 220 may communicate using a secure, proprietary, TCP-based connection that encrypts and authenticates traffic.

User interface server 210 may manage the system resources and data that drives the functionality of management system 130. User interface server 210 may maintain database(s) to centralize the storage of information associated with network devices 110, such as their configuration data and policies. The database(s) may store data associated with network devices 110 and templates as objects.

Figure 3:
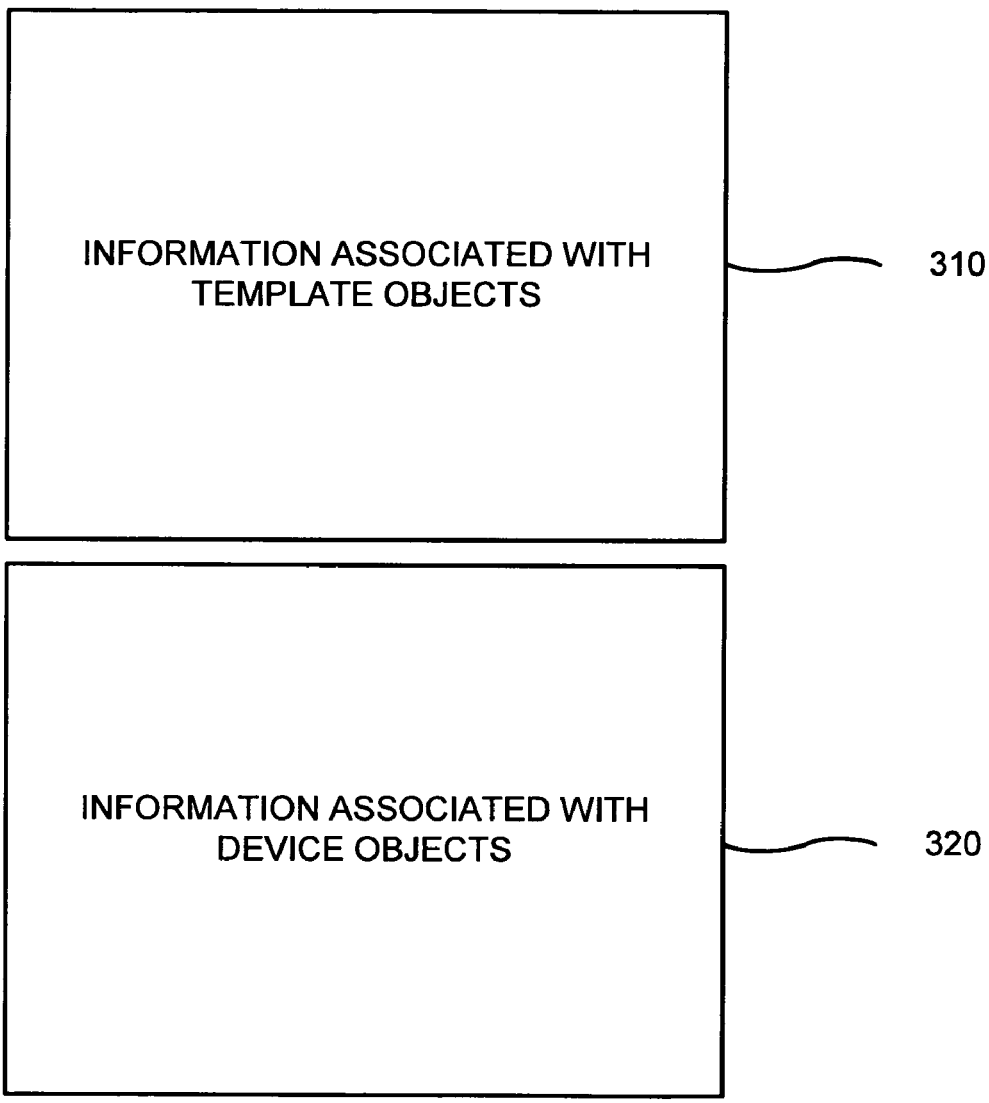
FIG. 3 is an exemplary block diagram of a portion of a database that may be maintained by the management system of FIG. 1 according to an implementation consistent with the principles of the invention.

FIG. 3 is an exemplary diagram of a portion of a database 300 that may be maintained by user interface server 210 according to an implementation consistent with the principles of the invention. Database 300 may include information associated with template objects 310 and information associated with device objects 320. Each template object may correspond to a template and can refer to other template objects. In one implementation, templates are generic in that they apply to different types and versions of network devices 110. In another implementation, templates are specific in that they apply to specific types or versions of network devices 110. In yet another implementation, templates may be operator-configurable as either generic or specific.

Each device object may correspond to a deployed or undeployed one of network devices 110. A deployed device refers to a device that is currently being used in network 100. An undeployed device refers to a device that is not currently being used in network 100. A new device configuration can be modeled for an undeployed device prior to installing the configuration on a physical device.

Both template objects and device objects may provide parameter values for network devices 110. As used herein, "parameter values" are intended to include subparameter values, sub-subparameter values, etc. Parameters may be unset. When this occurs, a device object value or a default value may be used.

Figure 4A:
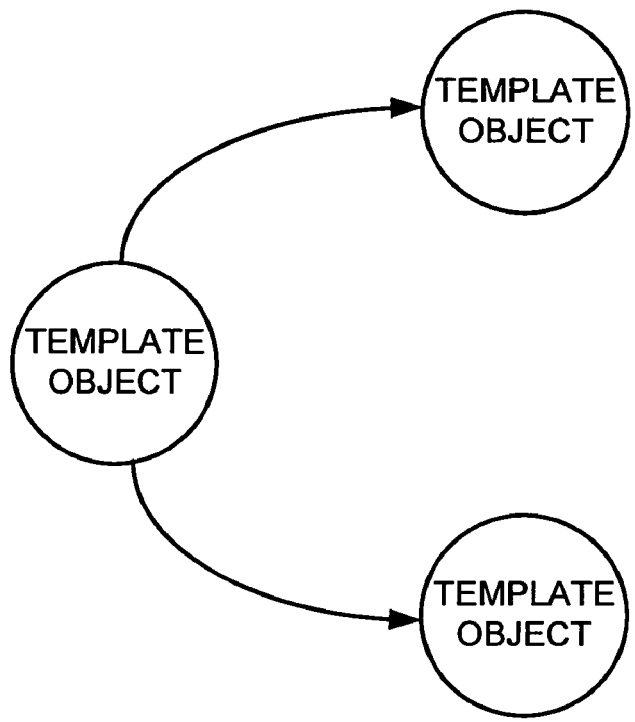
FIGS. 4A and 4B illustrate exemplary relationships between device objects and template objects according to an implementation consistent with the principles of the invention.
Figure 4B:
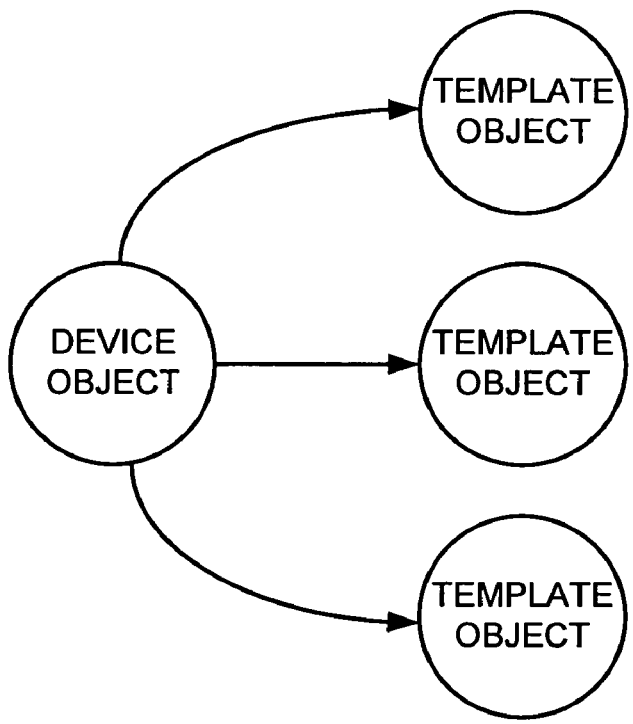

Various relationships may exist between template objects and device objects. FIGS. 4A and 4B illustrate two possible relationships. As shown in FIG. 4A, a template object may refer to multiple template objects. In this case, a template object may be used to supply a configuration parameter value (or multiple configuration parameter values) for another template object.

As shown in FIG. 4B, a device object may refer to multiple template objects. As described above with regard to FIG. 4A, any of these template objects may refer other template objects. When a device object refers to more than one template object, conflicts may arise when two (or more) template objects contain different values for the same configuration parameter. Accordingly, the template objects may be prioritized so that the higher priority template values override lower priority template values. An operator may set or change the priority of template objects referred to by a device object. The operator may also set parameter values within the device object that may override any conflicting template parameter values. The operator may determine where a parameter value comes from (e.g., a default value, a template value, or a device object value) via one of user interface devices 120 (FIG. 1). Several techniques are known in the art for presenting this information to the operator.

To illustrate the overriding of parameter values, assume that a device (D1) refers to two templates (T1 and T2) and that template T2 is higher in priority than template T1.

| D1 | T1 | T2 |
|---|---|---|
| type: device<br>templates:<br>T1<br>T2<br>shape: square | type: template<br>shape: round<br>texture: smooth<br>color: green | type: template<br>color: red |

The configuration parameter values for device D1 may be determined as follows: the parameter shape has a value of "square" (where the value in T1 is overridden by the value in D1); the parameter color has a value of "red" (where the value in T1 is overridden by the value in T2); and the parameter texture has a value of "smooth" (i.e., the value in T1). If neither the device nor its templates specify a value for a parameter, then a default value (if defined) may be used.

To further illustrate the overriding of parameter values, assume that a device (D1) refers to two templates (T1 and T2) and that template T2 is higher in priority than template T1.

| D1 | T1 | T2 |
|---|---|---|
| type: device<br>templates:<br>T1<br>T2<br>zone: pluto | type: template<br>zone: saturn | type: template<br>zone: delete saturn<br>zone: jupiter |

The zones may be handled as follows: the parameter value "saturn" is specified by T1 but is deleted by T2 and, therefore, does not exist for D1; the parameter value "jupiter" is set for D1 as specified by T2; and the parameter value "pluto" is set for D1 as specified by D1.

For each device parameter, there is a path from the top of the template through various subparameters to the parameter. To find the corresponding data in the template, each parameter in the path, starting from the top, may be examined. There are two cases for stepping down the path in the template: (1) the simple parameters case, and (2) the list parameters case.

Simple parameters can have a single value for each of its subparameters. Simple parameters may be identified by a fixed keyword in the device object (e.g., "status"). As another example, "header" is a simple parameter that has several subparameters, such as "osVersion" and "platform." In this case, the template may be examined to find a parameter with the same fixed keyword in the template.

List parameters can have multiple values for each of its subparameters. For example, "zone" is a list parameter that can have can have multiple subparameters that, in the simple case, can be identified by the data in the subparameter (e.g., TRUST and UNTRUST). In this case, the template may be examined to find a parameter with a matching key field value in the template.

The structure of list and key parameters may be defined in an object schema. In the example above, the matching is done using the value from a single subparameter. The schema may alternatively specify that matching is to be done using multiple subparameters—all of which must be equal to find the matching parameter.

Returning to FIG. 2, device server 220 may enable network devices 110 to connect to and communicate with management system 130. While FIG. 2 shows a single device server 220, there may be additional device servers 220 in other implementations consistent with the principles of the invention. Some of the functions performed by device server(s) 220 may include translating communication between user interface server 210 and network devices 110, collecting information from network devices 110, formatting configuration information sent to network devices 110, and/or consolidating log and event data from network devices 110.

Figure 5:
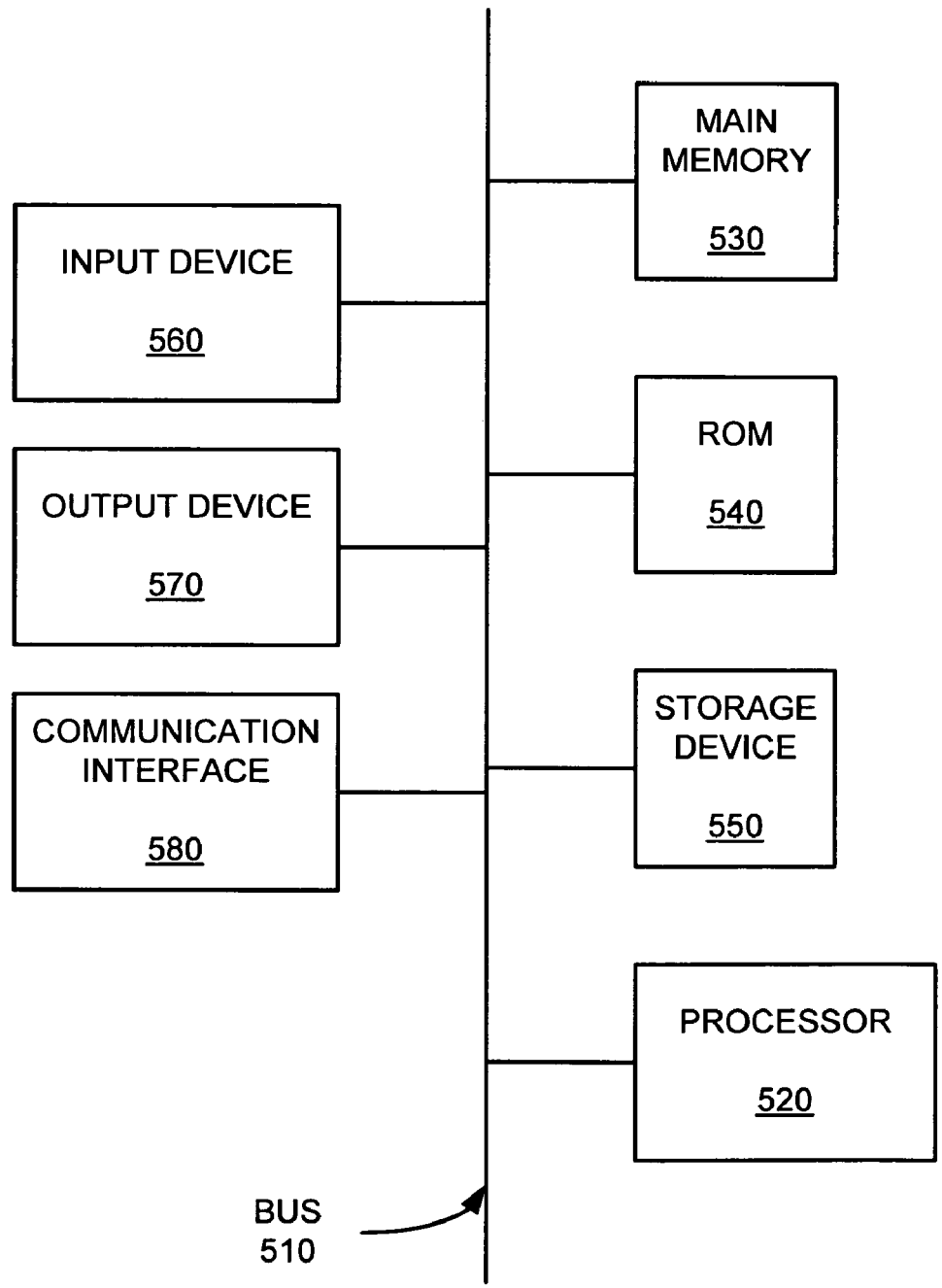
FIG. 5 is an exemplary block diagram of a user interface device or the management system of FIG. 1 or the user interface server or device server of FIG. 2 according to an implementation consistent with the principles of the invention.

Exemplary Architecture of User Interface Device, Management System, User Interface Server, and/or Device Server FIG. 5 is an exemplary diagram of a device 500 that may correspond to one of user interface devices 120, management system 130, user interface server 210, and/or device server 220 according to an implementation consistent with the principles of the invention. Device 500 may include a bus 510, a processor 520, a main memory 530, a read only memory (ROM) 540, a storage device 550, an input device 560, an output device 570, and a communication interface 580. Bus 510 may permit communication among the elements of device 500.

Processor 520 may include a conventional processor, microprocessor, or processing logic that may interpret and execute instructions. Main memory 530 may include a random access memory (RAM) or another type of dynamic storage device that may store information and instructions for execution by processor 520. ROM 540 may include a conventional ROM device or another type of static storage device that may store static information and instructions for use by processor 520. Storage device 550 may include a magnetic and/or optical recording medium and its corresponding drive.

Input device 560 may include a conventional mechanism that permits an operator to input information to device 500, such as a keyboard, a mouse, a pen, voice recognition and/or biometric mechanisms, etc. Output device 570 may include a conventional mechanism that outputs information to the operator, including a display, a printer, a speaker, etc. Communication interface 580 may include any transceiver-like mechanism that enables device 500 to communicate with other devices and/or systems.

Device 500 may perform certain processes in response to processor 520 executing software instructions contained in a computer-readable medium, such as memory 530. A computer-readable medium may be defined as a physical or logical memory device and/or carrier wave. The software instructions may be read into memory 530 from another computer-readable medium, such as storage device 550, or from another device via communication interface 580. The software instructions contained in memory 530 may cause processor 520 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing

Figure 6:
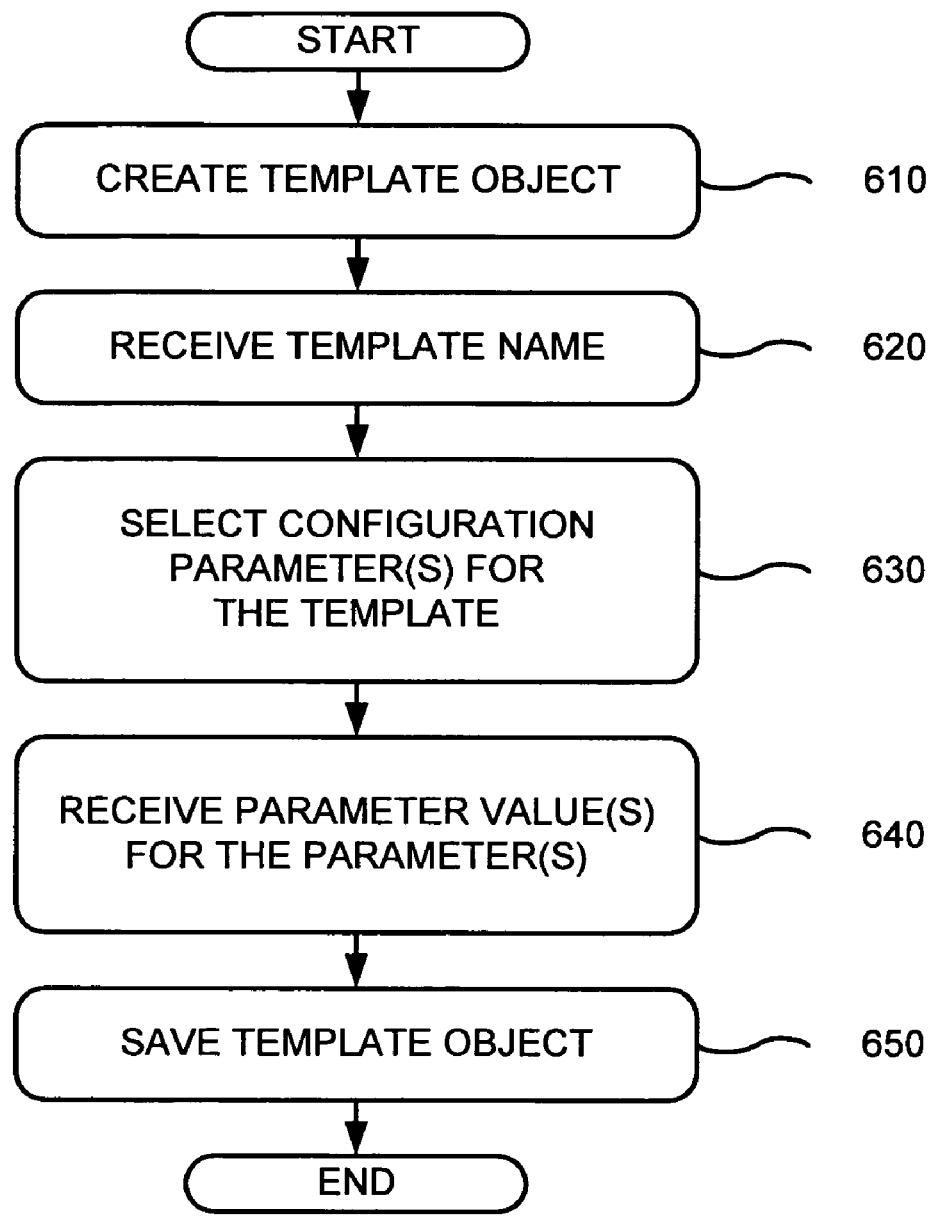
FIG. 6 is a flowchart of exemplary processing for creating a template according to an implementation consistent with the principles of the invention.

FIG. 6 is a flowchart of exemplary processing for creating a template according to an implementation consistent with the principles of the invention. Processing may begin with an operator interacting with a user interface on a device, such as one of user interface devices 120 (FIG. 1). The user interface may present the operator with the option of creating a template, such as an add template button. Selection of the add template button may cause a new template object to be created (act 610).

In one implementation, the user interface may present the operator with a new template dialog window in response to the operator's selection of the add template button. The new template dialog window may present the operator with the option of naming the template and a list of configuration parameters (including subparameters, sub-subparameters, etc.) for which configuration data may be presented. The configuration parameters may correspond to all possible parameters that may be configured for a device, such one of network devices 110.

A template name may be provided by the operator (act 620). The template name may be used to refer to the template and/or to distinguish the template from other templates. One or more configuration parameters may be selected from the list of configuration parameters (act 630). For each of the selected configuration parameters, one or more parameter values may be received (act 640). For example, the operator may provide a value for each of the selected configuration parameters. Alternatively, the operator may refer to another template to provide values for one or more of the configuration parameters.

When the operator finishes providing values for the selected configuration parameters, the operator may save the new template. For example, the operator may select a save button provided in the user interface. In response to selection of the save button, the new template may be saved. In one implementation, the new template may be saved as a template object (act 650) within information associated with template objects 310 (FIG. 3) of database 300.

Figure 7:
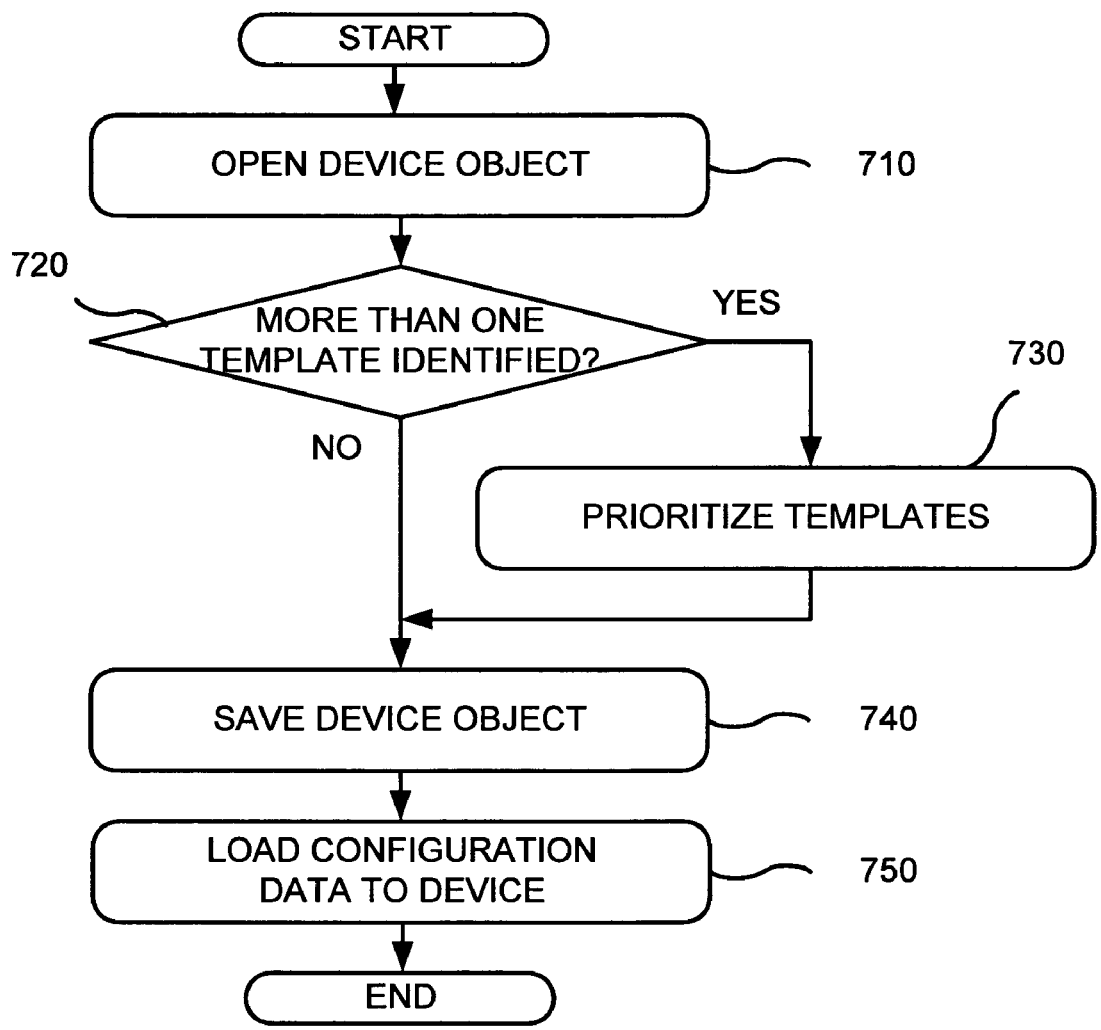
FIG. 7 is a flowchart of exemplary processing for referencing a template by a device object according to an implementation consistent with the principles of the invention.

Once a template is created, it may be desirable to let a device object refer to it. FIG. 7 is a flowchart of exemplary processing for referencing a template by a device object according to an implementation consistent with the principles of the invention. Processing may begin with the operator interacting with a user interface on a device, such as one of user interface devices 120 (FIG. 1). The user interface may present the operator with the option of opening a device object, such as a device button. The user interface may then present the operator with a list of deployed and undeployed (modeled) devices in network 100 (FIG. 1). Selection of one of the devices from the list of devices may be received to indicate the operator's desire to open the device object associated with the device (act 710).

In one implementation, the user interface may present the operator with a device dialog window in response to the operator's selection of a device. The device dialog window may present the operator with configuration options. The operator may be presented with the current parameter values for the device and, optionally for each parameter value, where the data originated (e.g., default value, device value, or template value). The data origin information (possibly in combination with a flag in the template) may be used to limit which parameters of the device object can be modified. For example, if a no-modification flag is set in the template, then parameters specified by the template cannot be modified.

The operator may select one of the configuration options to provide a parameter value or identify a template (or templates) that will provide one or more parameter values. If the operator selected more than one template (act 720), the order in which the templates are applied may be prioritized (act 730). As explained above, the order in which templates are applied may be beneficial when values in different applied templates conflict. A value from a higher priority template may override a value from a lower priority template. The order in which the templates are applied may be determined and modified by the operator.

When the operator finishes providing parameter values, the operator may save the device object. For example, the operator may select a save button provided in the user interface. In response to selection of the save button, the device object may be saved (act 740). In one implementation, the device object may be saved in information associated with device objects 320 (FIG. 3) of database 300.

The configuration data from the device object and the template(s) may then be loaded into the physical device (act 750). For example, management system 130 may determine whether a connection exists with the device (e.g., one of network devices 110). Management system 130 may then push the configuration data to the device to configure the device.

Figure 8:
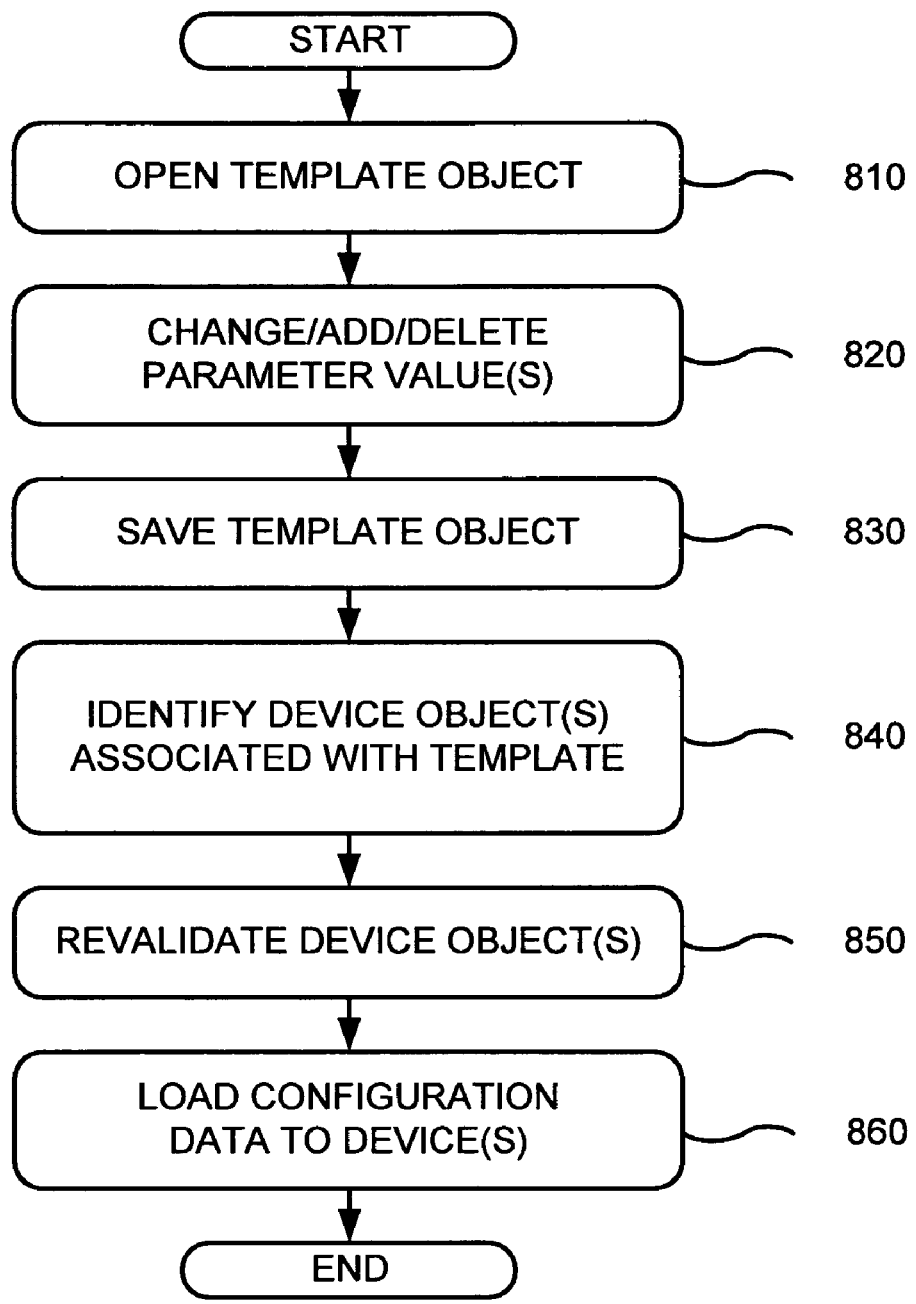
FIG. 8 is a flowchart of exemplary processing for modifying a template according to an implementation consistent with the principles of the invention.

At some point, the operator may desire to modify an existing template. FIG. 8 is a flowchart of exemplary processing for editing a template according to an implementation consistent with the principles of the invention. Processing may begin with an operator interacting with a user interface on a device, such as one of user interface devices 120 (FIG. 1). The user interface may present the operator with the option of opening a template object, such as a template button. The user interface may then present the operator with a list of previously-created templates. Selection of one of the templates from the list of templates may be received to indicate the operator's desire to open the template object associated with the template (act 810).

In one implementation, the user interface may present the operator with a template dialog window in response to the operator's selection of a template from the list of templates. The template dialog window may present the operator with a list of configuration parameters. The operator may then modify the template by, for example, changing, adding, deleting, or otherwise modifying parameter values corresponding to the configuration parameters that the template contains (act 820).

When the operator finishes modifying the template, the operator may save the modified template. For example, the operator may select a save button provided in the user interface. In response to selection of the save button, the modified template may be saved. In one implementation, the modified template may be saved as a template object (act 830) within information associated with template objects 310 (FIG. 3) of database 300.

It is possible that a configuration parameter within the modified template may include a parameter value that is invalid for or unsupported by one of the devices that refers to the modified template. Accordingly, the device object(s) referring to the template may be identified (act 840). The device object(s) may be identified via an analysis of the device objects in information associated with device objects 320 (FIG. 3).

The identified device object(s) may then be revalidated (act 850). The revalidation process may occur prior to or after the template object is saved to database 300. The revalidation process may check, for example, whether parameter values are well-formed for their type (e.g., integer, IP, boolean), enumeration values are from the allowable list, integer values are in range, string lengths are in range, required parameters are present, and/or lists have an appropriate number of repetitions for each identified device object(s). Invalid device configurations may be marked in some manner so that the operator can remedy the invalid or unsupported parameter values.

The configuration data from the identified device object(s) and the relevant template objects, including the modified template object, may then be loaded into the physical device (s) (e.g., one(s) of network devices 110) associated with the identified device object(s) (act 860). For example, management system 130 may determine whether a connection exists with one of these devices. Management system 130 may then push the configuration data to the device to configure the device.

Figure 9:
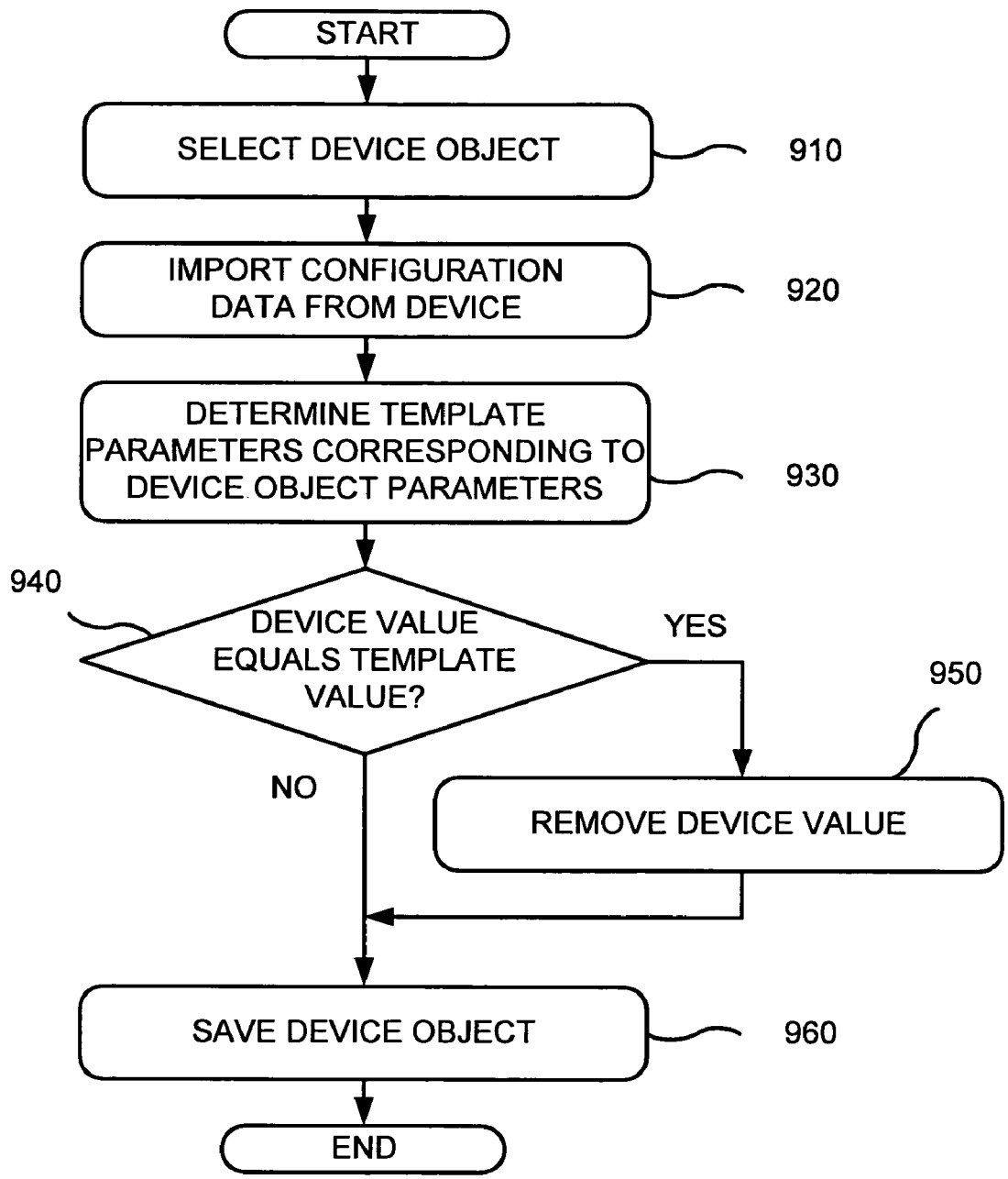
FIG. 9 is a flowchart of exemplary processing for importing configuration data from a device according to an implementation consistent with the principles of the invention.

At some point, the operator may desire to import configuration data from a device, such as one of network devices 110 (FIG. 1). FIG. 9 is a flowchart of exemplary processing for importing configuration data from a device according to an implementation consistent with the principles of the invention. Processing may begin with an operator interacting with a user interface on a device, such as one of user interface devices 120. The user interface may present the operator with the option of opening a device object, such as a device button. The user interface may then present the operator with a list of deployed and undeployed (modeled) devices in network 100 (FIG. 1).

The operator may select one of the devices from the list of devices (act 910) and indicate a desire for the import operation to be performed. The configuration data may be sent (imported) from the device (act 920). The configuration data may be loaded into the corresponding device object.

It may then be determined which template parameters correspond to the device object parameters (act 930). This may be done using keyword or key field value matching, as described above.

If matching parameters in the device object and the template have the same values (act 940), then the device parameter value may be removed (act 950). Removing identical parameter values preserves the usefulness of the templates and assures that future changes to the template parameter values will be applied to the device. Otherwise, if matching parameter values were left in the device object, then those parameter values would override the template values and nullify the effect of future changes to the template values for the device.

The device object may then be saved (act 960). In one implementation, the device object may be saved in information associated with device objects 320 (FIG. 3) of database 300.

CONCLUSION

Systems and methods consistent with the principles of the invention may assist in managing and configuring multiple, possibly distributed, devices based on one or more device templates that can specify configuration parameter values for the devices.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 6-9, the order of the acts may differ in other implementations consistent with the principles of the invention. Also, non-dependent acts may be performed in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A system for configuring a device, comprising:
a memory device to store a plurality of templates, the templates including parameter values for the device; and
a processor to:
prioritize the templates, a parameter value associated with a higher priority one of the templates overriding a parameter value associated with a lower priority one of the templates,
configure the device based on the parameter values in the templates and the priorities of the templates,
import configuration information from the device,
determine whether a device value in the imported configuration information equals a parameter value in one of the templates,
remove, when the device value in the imported configuration information equals the parameter value in the template, the device value from the imported configuration information to form modified configuration information,
determine whether a connection exists with the device, and
forward, when the connection exists, the modified configuration information to the device.

2. The system of claim 1, wherein one of the templates refers to another one of the templates.

3. The system of claim 1, wherein one of the templates comprises a generic template associated with a plurality of types of devices.

4. The system of claim 1, wherein one of the templates comprises a specific template associated with a specific type of device.

5. The system of claim 1, wherein the processor is further configured to:
determine whether a parameter in the one template matches a parameter associated with the device by performing a keyword or key list match.

6. A computer-implemented system for configuring a device, comprising:
means for storing a plurality of templates, the templates including configuration information for the device;
means for prioritizing the templates, configuration information associated with a higher priority one of the templates overriding configuration information associated with a lower priority one of the templates; and
means for configuring the device based on device configuration information, the configuration information in the templates, and the priorities of the templates, wherein the device configuration information overrides the configuration information in the templates where a conflict exists between the device configuration information and the configuration information in the templates.

7. A method for configuring a device, comprising:
associating a plurality of templates with the device, the templates including configuration information for the device;
prioritizing the templates, configuration information associated with a higher priority one of the templates overriding configuration information associated with a lower priority one of the templates for a configuration parameter associated with the device; and
configuring the device based on device configuration information, the configuration information in the templates and the priorities of the templates, wherein the device configuration information overrides the configuration information in the templates where a conflict exists between the device configuration information and the configuration information in the templates.

8. A system for configuring a device, comprising:
a memory device to store a plurality of templates, a first one of the templates obtaining a parameter value associated with the device from a second one of the templates; and
a processor to:
configure the device based on the parameter value in the first template that was obtained from the second template,
import configuration information from the device,
determine whether a device value in the imported configuration information equals a parameter value from one of the templates,
remove, when the device value in the imported configuration information equals the parameter value in the template, the device value from the imported configuration information to form modified configuration information, and
forward the modified configuration information to the device.

9. The system of claim 8, wherein the processor is further configured to:
assign priorities to a set of the templates that specify a same configuration parameter associated with the device, and
configure the device based on the templates and the assigned priorities.

10. The system of claim 8, wherein one of the templates comprises a generic template associated with a plurality of different types of devices.

11. The system of claim 8, wherein one of the templates comprises a specific template associated with a specific type of device.

12. The system of claim 8, wherein the processor is further configured to:
determine whether a parameter in the one template matches a parameter associated with the device by performing a keyword or key list match.

13. A system for configuring a set of devices of different types, comprising:
a memory device to store a template associated with the devices, the template including generic configuration data that applies to the different types of devices; and
a processor to:
configure the devices based on the generic configuration data in the template,
import configuration information from one of the devices,
determine whether a device value in the imported configuration information equals a parameter value in the generic configuration data from the template,
remove, when the device value in the imported configuration information equals the parameter value in the template, the device value from the imported configuration information to form modified configuration information, and
save, to the memory device, a device object including the modified configuration information and corresponding to the one device.

14. The system of claim 13, wherein the template obtains at least some of the configuration data from another template.

15. The system of claim 13, wherein the processor is further configured to:
modify the generic configuration data included in the template to obtain modified configuration data,
identify the devices that are associated with the template, and
load the modified configuration data from the template into the identified devices.

16. The system of claim 15, wherein the processor is further configured to validate data associated with the identified devices prior to loading the modified configuration data from the template into the identified devices.

17. A system for configuring a device, comprising:
a memory device to store a template that includes a parameter value for configuring the device; and
a processor to:
import configuration information from the device,
determine whether a device value in the imported configuration information equals the parameter value in the template, and
remove, from the imported configuration information, the device value when the device value equals the parameter value in the template to form modified configuration information associated with the device.

18. The system of claim 17, wherein the template obtains the parameter value from another template.

19. The system of claim 17, wherein the template comprises a generic template associated with a plurality of different types of devices.

20. The system of claim 17, wherein the template comprises a specific template associated with a specific type of device.

21. The system of claim 17, wherein the processor is further configured to:
modify the parameter value included in the template to obtain a modified parameter value,
identify one or more devices that are associated with the template, and
load the modified parameter value from the template into the one or more identified devices.

22. The system of claim 21, wherein the processor is further configured to validate data associated with the one or more identified devices prior to loading the modified parameter value from the template into the one or more identified devices.

23. A system for configuring devices, comprising:
a memory device to store a template that is associated with a set of devices, the template including configuration data for configuring the devices; and
a processor to:
modify configuration data included in the template,
identify the devices that are associated with the template,
validate data associated with the identified devices,
load the configuration data from the template into the identified devices after validating the data associated with the identified devices, import configuration information from one of the devices, determine whether a device value in the imported configuration information equals a parameter value in the configuration data in the template, and remove, from the imported configuration information, the device value when the device value equals the parameter value.

24. The system of claim 23, wherein the template obtains at least some the configuration data from another template.

25. The system of claim 23, wherein the set of devices comprise a plurality of different types of devices.

26. The system of claim 23, wherein the set of devices comprise a specific type of devices.

* * * * *